April 30, 1963     U. NURME     3,087,273

FISH LURE

Filed May 29, 1961

INVENTOR.

Udo Nurme

BY *Snow and Benno*

ATT'YS.

United States Patent Office 3,087,273
Patented Apr. 30, 1963

3,087,273
FISH LURE
Udo Nurme, 2043 N. Kenmore Ave., Chicago, Ill.
Filed May 29, 1961, Ser. No. 113,430
2 Claims. (Cl. 43—42.06)

This invention relates to a new and improved fish lure.

Thousands of artificial fish lures have been made throughout the years in man's quest to outwit the game fish that lie beneath the surface of lake and ocean waters. Men have fished from the beginning of time and they are constantly looking for new means to attract and then to catch fish. Many artificial lures take the form of natural bait and oftentimes are made to simulate bright colored small fish. Another so-called effective fish lure is one which has peculiar actions or movements when pulled through a body of water. This latter type sometimes called a "crippled" lure tends to bob in the water and create intermittent small splashes to attract game fish which might be lurking therebeneath. In every instance, however, the lures are similar in one respect and that is that they are equipped with hooks to catch the unsuspecting fish when he strikes the lure. Still another type of lure is one which is a composite of artificial and natural bait. The natural bait is used to attract the fish either by odors or by sight and to cause the fish to believe that the entire lure is a live bait which could constitute a delectable meal for him. The means for combining artificial and natural bait has taken many forms and it is one of those types of lures that the present invention is primarily concerned.

A principal object of this invention is to provide a combination fish lure consisting of an artificial housing and including means for carrying a natural bait.

An important object of this invention is the provision of means in an artificial fish lure for carrying a natural bait therein and permitting seepage of the natural bait from the interior of the lure to the exterior.

Another important object of this invention is to equip an elongated fish lure with a generally longitudinally extending chamber to carry a natural fish food.

A still further important object of this invention is to supply an artificial fish lure arranged and constructed to simulate a generally elongated fish and the fish body having two longitudinally disposed side-by-side parts which are hinged together on a longitudinally extending hinge and the body further providing latch means for removably securing the two longitudinally disposed parts together to thereby hold a fish food or the like within the elongated body of the fish lure.

Another and still further important object of this invention is to provide an artificial fish lure of the elongated type having a generally longitudinally extending chamber therewithin for the purpose of receiving a fish food and the body having openings therein to permit seepage of the food therefrom during pulling of the lure through a body of water to attract fish and cause the fish to strike the lure and become ensnared on the hooks carried by the lure.

Another and still further important object of this invention is to equip a two-part, generally elongated, hollow fish lure with a longitudinally extending hinge means joining the two parts at their one sides and including further an openable latch means joining the two parts at their other sides.

Still another important object of this invention is the provision of means in a two-part fish lure in which the parts simulate the longitudinally extending sides of a fish and having interrelated hinge elements along mating edges of the fish lure parts at one side thereof and a snap latch at the mating edges along an opposite side thereof.

A still further important object of this invention is to supply a hollow elongated simulated fish lure having generally vertically disposed slit-like openings therein and means openable over the full length of the lure to insert a food for attracting a game fish and whereby the internally deposited food is permitted to seep out of the vertical slits and leave a trail in the body of water through which the lure is pulled.

Another important object of this invention is to provide a fish lure with a food receiving chamber therein and means to vary the effective sizes of openings in the lure communicating between the food chamber and the exterior of the lure.

A further important object of this invention is the provision of a fish lure with two parts and mechanism for adjoining the parts in various relationship to thereby open or substantially close the lure to admit greater or lesser amounts of water to pass through the interior thereof.

Other and further important objects and advantages will become apparent from the disclosures in the following specification and accompanying drawings.

Figure 1:
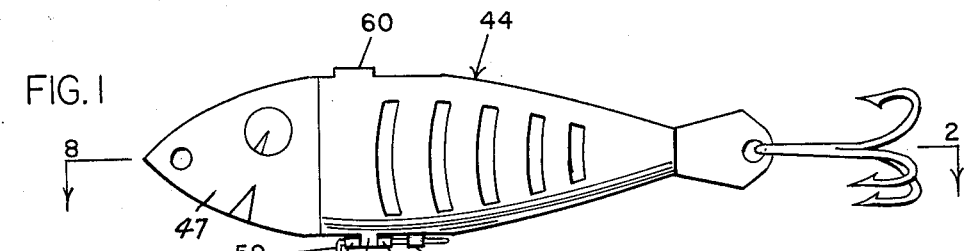
FIGURE 1 is a side elevational view of a modified form of fish lure of this invention.

The fish lure of this invention shown in FIGURES 1, 2, 3 and 4 includes a generally elongated body 44 having a first part 45 and a second part 46. The first part 45 includes a flat head 47, a flat tail 48, and an intermediately disposed elongated concavo-convex central portion 49. The central portion 49 is equipped with generally vertically disposed slits or openings 50 which appear as gills in the simulated fish of this lure. The flat head 47 is provided with a hole or opening therethrough as shown at 51 to receive a fish line and similarly the flat tail 48 has a transverse hole 52 to receive a treble barbed fish hook 53.

The second part 46 of the body 44 is substantially coextensive with the central portion 49 of the first part 45. The second part 46 is concavo-convex in shape and is provided with generally vertically disposed slits in the form of gills or the like 54.

Figure 2:
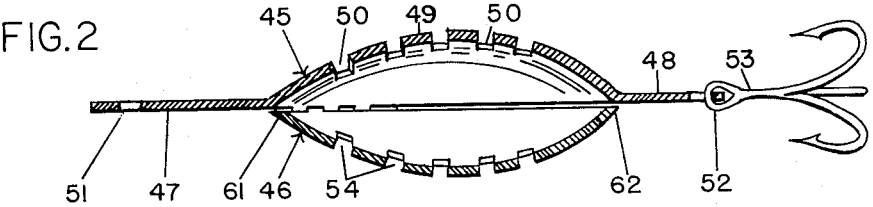
FIGURE 2 is a sectional view taken on the line 8—8 of FIGURE 1.

The first part 45 is equipped with downwardly extending rolled extensions 55, 56 and 57. These extensions are longitudinally spaced apart but axially aligned on the lower edge of the part 45. The second, or complementary part 46 for the lure body 44 is similarly provided with a downwardly projecting rolled extension 58. When the two halves 45 and 46 are placed together to form the elongated fish lure of this invention the downwardly projecting rolled, sleeve-like extensions 55, 56, 57 and 58 are all in axial alignment so that a hinge pin 59 passing longitudinally therethrough will hold the parts in their relative positions to each other for use as a fish lure. A snap latch member 60 is provided on the top edge of the second part 46 and is adapted to grip over onto the top edge of the first part 45. In the position of the parts 45 and 46 as shown in FIGURES 1 and 2, the front and rear edges constitute a relatively loose seal between the adjoining parts. The forward edge 61 of the second part 46 loosely seals the enclosure against the flat head 47 of the first part 45, and similarly the rear or trailing edge 62 loosely seals against the flat tail portion 48 of that first part. Thus, there is a minimum of water drawn in and let out through the forward and trailing edges of the adjoining parts and thus a minimum of dissolving of the internally disposed food within the lure. Water taken in through the front opening between the leading edge 61 and the flat head 47 thus passes over the internally disposed food and dissolves with a portion thereof for seepage of the food outwardly either through the side gills or openings 54 or out the rearward opening defined by the trailing edge 62 with the flat tail portion 48.

Figure 3:
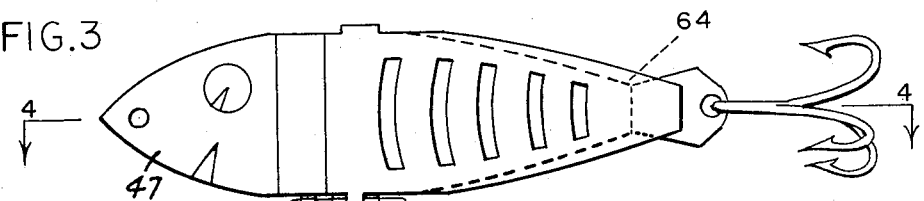
FIGURE 3 is a side elevational view of the lure of FIGURE 1 with the component parts thereof assembled in a different relationship.
Figure 4:
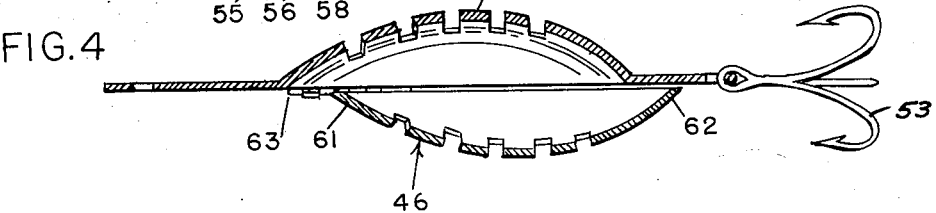
FIGURE 4 is a sectional view taken on the line 4—4 of FIGURE 3.

It should be noted that in FIGURES 1 and 2 the apparently extra rolled sleeve extension 57 is not utilized to receive an intermediately disposed rolled sleeve from the adjoining part. However, the device as shown in FIGURES 3 and 4 shows the second part 46 spaced rearwardly of its position of relation with respect to the first part as shown in FIGURES 1 and 2. In FIGURES 3 and 4 the rolled lower extension 58 is disposed between the rolled extensions 56 and 57 rather than between the rolled extensions 55 and 56 as in FIGURES 1 and 2. Now in this relationship of parts the hinge pin 59 is passed through the axially aligned openings 56, 58 and 57, and the second part 46 is in a new relationship relative to the first part 46. The forward edge 61 of the second part 46 no longer abuts the flat surface of the head 47 but rather is disposed rearwardly of the head 47 and is located substantially opposite a concave portion of the central section 49 of the first part 45. This then leaves a large opening 63 for the drawing in of substantial volumes of water as the lure is drawn through a body of water. This stimulates the solubility of the internally disposed food material and thus the device with the auxiliary hinge sleeves is adjustable to vary the amount of water which may be drawn into and through the lure in its operation. The rearward edge 62 of the second part 46 abuts the flat tail 48 at a position rearwardly from its previous abutting position but in this instance the body portions have a less effective seal by reason of the overlapping of the restricted portion of the first part 45 by a relatively large portion of the part 46. This spacing 64 provides for the rapid escape of the volume of fluid taken in through the front opening 63 as well as the discharge of water coupled with food particles through the side openings 50 and 54.

In the operation of the lure as shown in FIGURES 1 through 4 inclusive it is apparent that the user of the lure may control the amount of water which he desires to be admixed with the food placed in the interior of the longitudinally extending hollow body 44. This is accomplished merely by placing the second part 46 in a particular position relative to the first part 45 and inserting the hinge pin 59 in either of the positions provided therefor, as shown in the drawings. FIGURES 1 and 2 show the position wherein the forward and rearward edges of the adjoining parts 45 and 46 are substantially closed whereas in the relationship of parts shown in FIGURES 3 and 4 the forward and rearward adjoining edges of the parts are substantially open to permit the passage of a greater volume of water through the lure as the lure is pulled through a body of water containing game fish. In the position of the device as shown in FIGURES 3 and 4 there would obviously be a greater trail of food particles in the trolling operation.

The flat head portion may be made relatively short if desired compared to the over-all length of the lure and the eye may be painted on the curved portion of the lure body instead of the flat portion.

I am aware that numerous details of construction may be varied throughout a wide range without departing from the principles disclosed herein and I therefore do not propose limiting the patent granted hereon, otherwise than as necessitated by the appended claims.

What is claimed is:

1. A fish lure comprising a generally elongated hollow body simulating a fish, said body having a first longitudinally extending part, said first part having a central elongated portion concavo-convex in shape, a second longitudinally extending part substantially equal in length to the elongated central portion of said first part, said second part being concavo-convex in shape, said first and second parts together forming the generally elongated hollow body of the fish lure and having a generally oval shape in cross section, longitudinally disposed hinge means joining said first and second parts along one of their adjoining longitudinally extending edges and an openable latch means joining said first and second parts along their other longitudinally extending adjoining edges, said body having openings therein to provide communication between the interior and the exterior, said longitudinally disposed hinge means comprising spaced apart rolled extensions on one of said parts and a cooperating rolled extension on the other of said parts, said rolled extensions all disposed in longitudinally axial alignment when the first and second parts are together and complementing each other to form the hollow body, a removable hinge pin passing longitudinally through said aligned rolled extensions, one of said parts having an auxiliary rolled extension spaced rearwardly from the other rolled extensions but in axial alignment therewith whereby the second part may be disposed in longitudinally offset relationship with respect to the central portion of the first part to vary the amount of water entering the front of the lure.

2. A fish lure having two elongated complementary parts forming a hollow body, hinge means joining said two parts along one side thereof, and latch means removably fastening said two parts along another side thereof, said hinge means including a plurality of spaced apart hinge sleeves on one of said parts and said other part having a cooperating hinge sleeve to permit lateral alignment of the two parts or lateral misalignment, and a removable hinge pin passing through said hinge sleeves whereby when the parts are in lateral misalignment the front and rear form openings for the passage of water through the hollow body.

References Cited in the file of this patent

UNITED STATES PATENTS

| | | |
|---|---|---|
| 586,620 | Osborn | July 20, 1897 |
| 1,913,362 | Catarau | June 13, 1933 |
| 2,205,472 | Fagerholm | June 25, 1940 |
| 2,842,889 | Ganger | July 15, 1958 |

FOREIGN PATENTS

| | | |
|---|---|---|
| 454,454 | Canada | Feb. 8, 1949 |
| 552,126 | France | Jan. 17, 1923 |